(12) United States Patent
Kwon et al.

(10) Patent No.: US 6,838,789 B2
(45) Date of Patent: Jan. 4, 2005

(54) RECIPROCATING MOTOR

(75) Inventors: Kye-Si Kwon, Seoul (KR); Hyuk Lee, Siheung (KR); Tae-Hee Kwak, Seoul (KR); Hyung-Jin Kim, Seoul (KR); Sang-Man Oh, Goyang (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 10/234,188

(22) Filed: Sep. 5, 2002

(65) Prior Publication Data

US 2003/0080634 A1 May 1, 2003

(30) Foreign Application Priority Data

Oct. 26, 2001 (KR) .......................................... 2001-66336
Oct. 31, 2001 (KR) .......................................... 2001-67519

(51) Int. Cl.[7] .......................... H02K 41/00; H02K 33/10
(52) U.S. Cl. ............................................ 310/12; 310/17
(58) Field of Search .............................. 310/12, 13, 14, 310/15, 17, 28, 30; 417/417

(56) References Cited

U.S. PATENT DOCUMENTS 4,827,163 A  5/1989 Bhate et al.
6,184,597 B1 * 2/2001 Yamamoto et al. ........... 310/14
6,238,192 B1 * 5/2001 Lee .............................. 417/417

FOREIGN PATENT DOCUMENTS

| JP | 9-205764 A | 8/1997 |
| JP | 2000-228855 A | 8/2000 |
| KR | 1999-0050283 A | 7/1999 |
| WO | 01/61830 A1 | 8/2001 |

* cited by examiner

*Primary Examiner*—Thanh Lam
*Assistant Examiner*—Judson H. Jones
(74) *Attorney, Agent, or Firm*—Birch, Stewart, Kolasch & Birch, LLP

(57) ABSTRACT

In a reciprocating motor capable of securing a stability of a motor by improving a strength of a magnet frame, preventing breakage of the magnet frame in operation of the motor and preventing an inner stator from rotating and separating from a support frame, the reciprocating motor includes an inner stator locker installed between the inner stator and the support frame and preventing the inner stator from separating from the support frame and a magnet frame having plural support bars formed at regular intervals so as to form a space portion in which the magnet is installed in the circumference direction.

18 Claims, 6 Drawing Sheets

RECIPROCATING MOTOR

BACKGROUND OF THE INVENTION

1. Field of the Invention

The present invention relates to a reciprocating motor, and in particular to a reciprocating motor which is capable of improving combining strength of parts constructing thereof.

2. Description of the Prior Art

Generally, in a reciprocating motor, an outer stator and an inner stator are placed at a certain interval, a rotor having a magnet is placed between the outer stator and the inner stator. When power is applied to a coil wound around the stators, the rotor is performs a linear reciprocating motion by mutual operation of the stator and the magnet. A reciprocating motor is mainly used for a reciprocating compressor, in the reciprocating compressor, by connecting a piston to a rotor, the piston can perform a linear reciprocating motion.

FIG. 1 is a partial transverse-sectional view illustrating the conventional reciprocating motor.

The conventional reciprocating motor includes a stator assembly 104 supported by a support frame 102 and generated a flux when power is applied; and a rotor assembly 106 placed around the stator assembly 104 with an air gap and performing a linear reciprocating motion by mutual operation with the flux generated in the stator assembly 104.

Herein, the stator assembly 104 includes an outer stator 108 having a cylindrical shape constructed with plural thin iron sheets laminated in the circumference direction; and a coil 112 wound around inside the outer stator 108 and generated a flux between the outer stator 108 and the inner stator 110 when power is applied.

A locking ring 114 for supporting the laminated iron sheets to make them maintain the cylindrical shape is respectively inserted into the both side surfaces of the outer stator 108.

As depicted in FIGS. 1 and 2, in the inner stator 110, plural iron sheets 124 are laminated in the circumference direction to have a cylindrical shape, a locking ring 116 for supporting the plural iron sheets 124 is respectively inserted into the both side surfaces of the inner stator 110, and a support frame 102 supports the inner stator 110.

The rotor assembly 106 includes plural magnets 118 placed in the circumference direction between the outer stator 108 and the inner stator 110; and a magnet frame 120, at which the plural magnets 118 are fixed to the outer circumference at regular intervals, connected to an operating part (not shown) performing a linear reciprocating motion.

As depicted in FIGS. 1 and 3, the magnet frame 120 having a cylindrical shape is placed between the outer stator 108 and the inner stator 110 so as to perform a reciprocating motion, and each groove 126 in which each magnet 118 is inserted is formed at the outer circumference of the magnet frame 120 at regular intervals.

The groove 126 has a width smaller than a thickness of the magnet 118, and the magnet 118 is fixedly inserted into the groove 126.

The operation of the conventional reciprocating motor will be described as below.

When power is applied to the coil 112, a flux is generated around the coil 112, the flux forms a closed loop along the outer stator 108 and the inner stator 110. Herein, by the mutual operation of the flux formed between the outer stator 108 and the inner stator 110 and the flux formed by the magnet 118, the magnet 118 is linearly moved in the axial direction. And, when a direction of a current applied to the coil 112 is alternately changed, a flux direction of the coil 112 is changed, and the magnet 118 performs a linear reciprocating motion.

By the motion of the magnet 118, the magnet frame 120 at which the magnet 118 is fixed performs a linear reciprocating motion, and accordingly construction parts such as a piston, etc perform a linear reciprocating motion.

Herein, in order to decrease an air gap between the outer frame 108 and the inner frame 110, a thickness of the magnet frame 120 has to be reduced to the utmost, and in order to transmit the linear reciprocating motion of the magnet 118 to the construction parts such as the piston, etc., the magnet frame 120 has to maintain a certain strength in consideration of stability of the motor.

However, in the conventional reciprocating motor, because the groove 126 is formed at a certain portion of the magnet frame 120 for fixing the magnet 118 and the groove portion has a smaller thickness and a lower stability than those of other portions, the groove portion may be damaged in the linear reciprocating motion of the magnet frame 120, and accordingly stability of the motor may be lowered.

In addition, in the conventional reciprocating motor, because the magnet 118 is fixedly inserted into the groove 126 formed at the magnet frame 120 and its combining strength is weak, the magnet 118 may be separated from the magnet frame 120 in the linear reciprocating motion of the magnet frame 120, and accordingly the magnet frame 120 may be damaged.

In addition, in the conventional reciprocating motor, the locking ring 116 is respectively inserted into the both side surfaces of the inner stator 110 to support the laminated plural iron sheets 124 of the inner stator 110, in the operation of the linear reciprocating motor, the laminated plural iron sheets 124 may be distorted or separated by the magnetic force of the magnet 118, and accordingly the motor may be damaged.

SUMMARY OF THE INVENTION

In order to solve the above-mentioned problem, it is an object of the present invention to provide a reciprocating motor which is capable of reducing a thickness of a magnet frame and improving stability thereof by bettering a combining structure of the magnet frame and a magnet.

It is another object of the present invention to provide a reciprocating motor which is capable of improving a reliability of a motor by preventing a magnet from separating from a magnet frame in operation of a reciprocating motor by bettering a combining structure of the magnet and the magnet frame.

It is yet another object of the present invention to provide a reciprocating motor which is capable of preventing an inner stator from rotating or separating from a support frame due to a magnetic force of a magnet and improving a stability of a motor by bettering a support structure of the inner stator.

A reciprocating motor includes an outer stator supported by a support frame; an inner stator placed around the inner circumference of the outer stator with a certain air gap and its inner circumference is supported by the support frame; an inner stator locker installed between the inner stator and the support frame and preventing the inner stator from separating from the support frame; a magnet placed between the outer stator and the inner stator so as to perform a linear motion; and a magnet frame having plural support bars formed at regular intervals to form a space portion in which the magnet is installed in the circumference direction.

The inner stator locker has an open central portion to be inserted into the outer circumference of the support frame and has plural rotation preventive protrusions formed at the internal surface so as to be inserted into the inner stator in order to prevent the rotation and the separation of the inner stator.

The inner stator locker is fixed to the support frame by welding.

Plural supporting grooves are formed at one side surface of the inner stator to engage with the rotation preventive protrusions of the inner stator locker.

The support bar has a certain thickness and a certain width so as to be maintainable strength of the magnet frame.

A magnet mounting portion is formed at the both side surfaces of the space portion of the magnet frame to mount the magnet which is inserted into the space portion.

A width of the magnet mounting portion is getting smaller from the outer circumference to the inner circumference of the magnet frame as a stepped shape.

The magnet mounting portion is formed at the inner circumference of the magnet frame in the circumference direction by a grooving method.

A supporting protrusion is formed at the both ends of the magnet to engage with the magnet mounting portion.

The magnet frame has a cylindrical shape having a certain thickness, each magnet mounting through hole in which the magnet is mounted is formed at the magnet frame at regular intervals, and each supporting protrusion is formed at the magnet frame so as to project from the outer circumference toward the inner circumference.

Each mounting groove is formed at the magnet from the outer circumference toward the inner circumference to engage with each supporting protrusion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, embodiments of a reciprocating motor in accordance with the present invention will be described with reference to accompanying drawings.

Lots of embodiments of a reciprocating motor in accordance with the present invention may be exist, hereinafter the preferred embodiments will be described.

Figure 1:
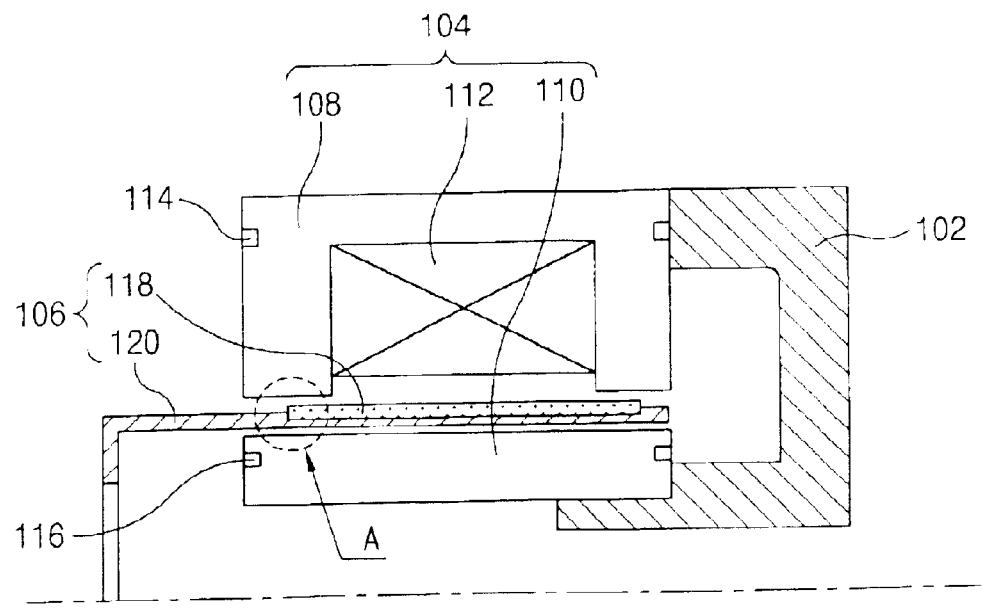
FIG. 1 is a partial transverse-sectional view illustrating the conventional reciprocating motor.
Figure 2:
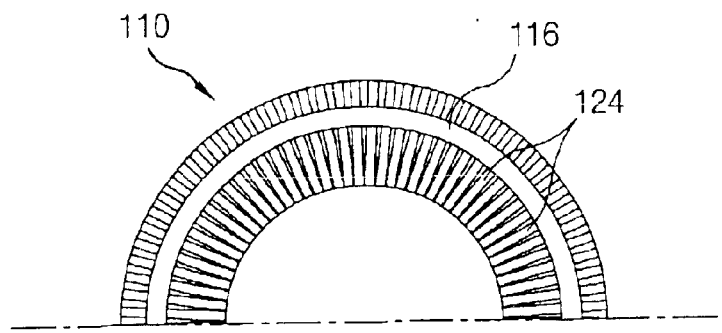
FIG. 2 is a side view illustrating an inner stator of the conventional reciprocating motor.
Figure 3:
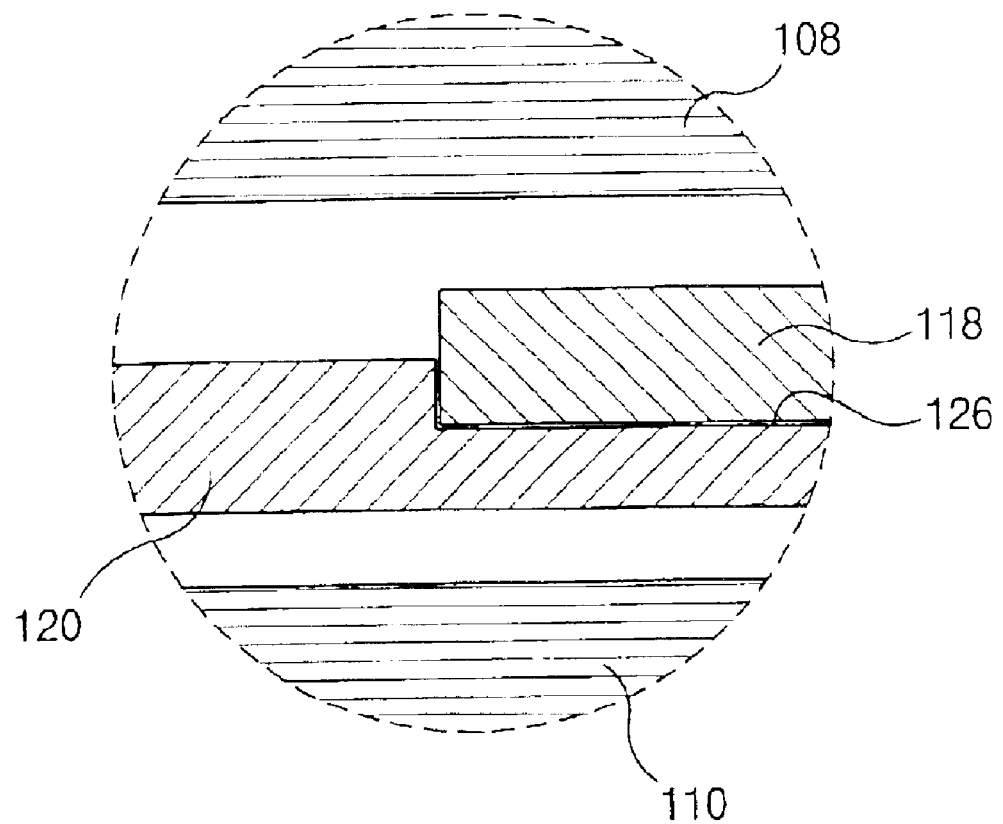
FIG. 3 is an enlarged view illustrating an A portion of the conventional reciprocating motor in FIG. 1.
Figure 4:
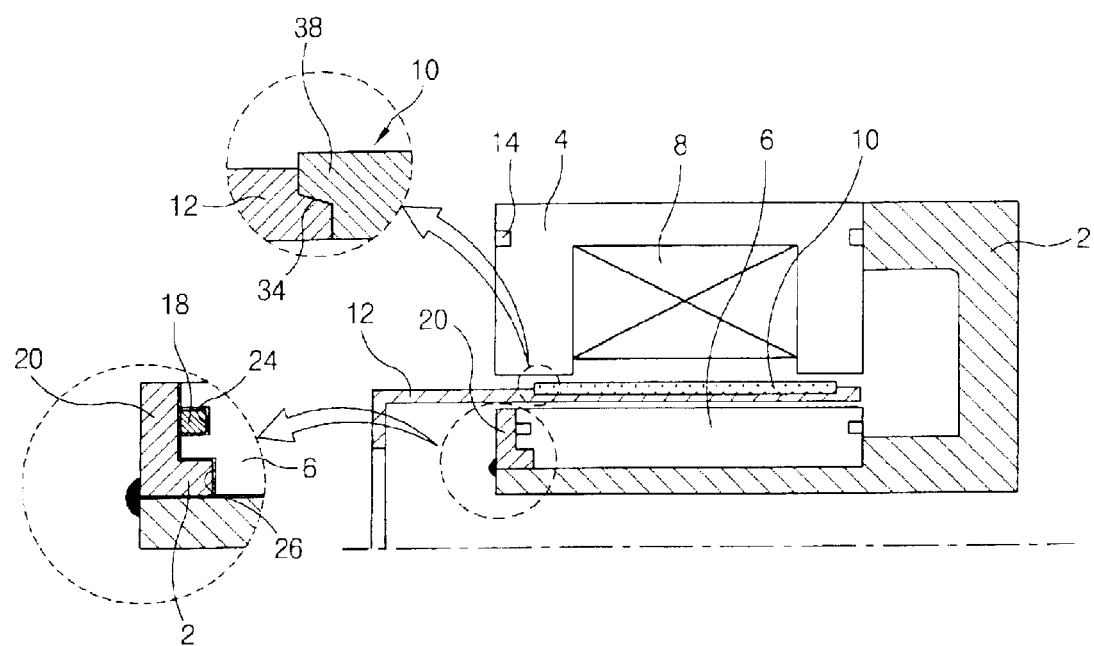
FIG. 4 is a partial transverse-sectional view illustrating a reciprocating motor in accordance with the present invention.

FIG. 4 is a partial transverse-sectional view illustrating a reciprocating motor in accordance with the present invention.

The reciprocating motor in accordance with the present invention includes an outer stator 4 supported by a support frame 2; an inner stator 6 placed around the inner circumference of the outer stator 4 with a certain air gap and generated a flux between the outer stator 4; a coil 8 wound around one of the outer stator 4 and the inner stator 6; a magnet 10 placed between the outer stator 4 and the inner stator 6 so as to perform a linear motion; and a magnet frame 12 connected between the magnet 10 and an operation part (not shown) performing a reciprocating motion and transmitting the reciprocating motion to an operation part.

Herein, when the reciprocating motor is applied to a reciprocating compressor, the operation part means a piston performing a linear reciprocating motion for compressing operation.

In the outer stator 4 having a cylindrical shape constructed with plural thin iron sheets laminated in the circumference direction, the coil 8 wound around the inner circumference of the outer stator 4, a locking ring 14 for supporting the laminated iron sheets to make them maintain the cylindrical shape is respectively inserted into the both side surfaces of the outer stator 4, and a support frame 2 supports a side surface of the outer stator 4.

Figure 5:
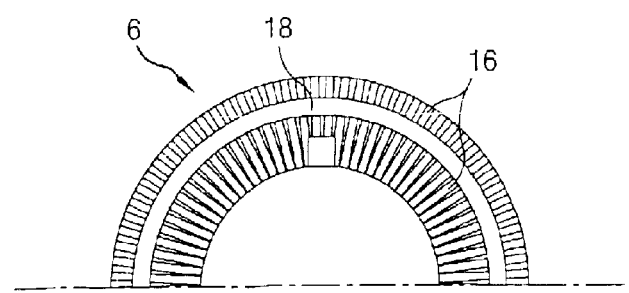
FIG. 5 is a side view illustrating an inner stator of the reciprocating motor in accordance with the present invention.

As depicted in FIG. 5, the inner stator 6 has a cylindrical shape constructed with plural thin iron sheets 16 laminated in the circumference direction and placed inside the outer stator 4 with a certain air gap, a locking ring 18 for supporting the laminated iron sheets to make them maintain the cylindrical shape is respectively inserted into the both side surfaces of the outer stator 4, and the inner stator 6 is supported by the inner circumference of the support frame 2.

Herein, an inner stator locker 20 is installed between the inner stator 6 and the support frame 2 in order to prevent the inner stator 6 from separating from the support frame 2.

Figure 6:
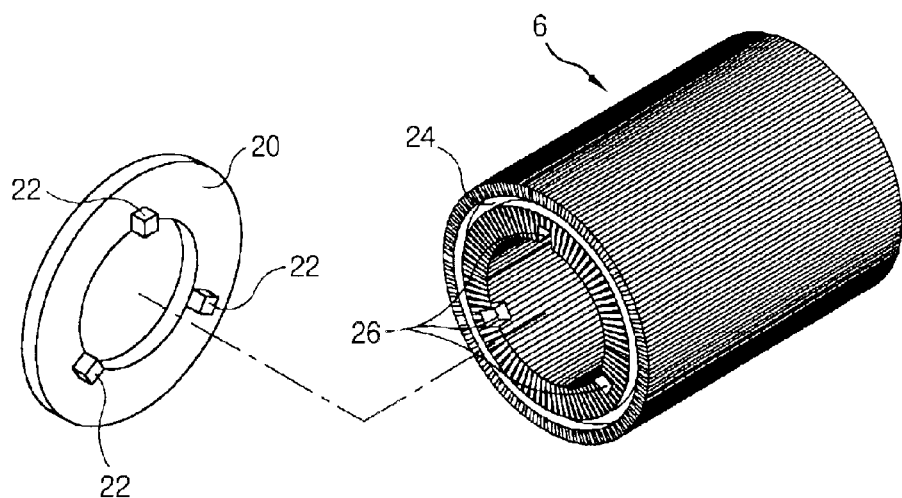
FIG. 6 is a perspective view illustrating the inner stator of the reciprocating motor in accordance with the present invention.
Figure 7:
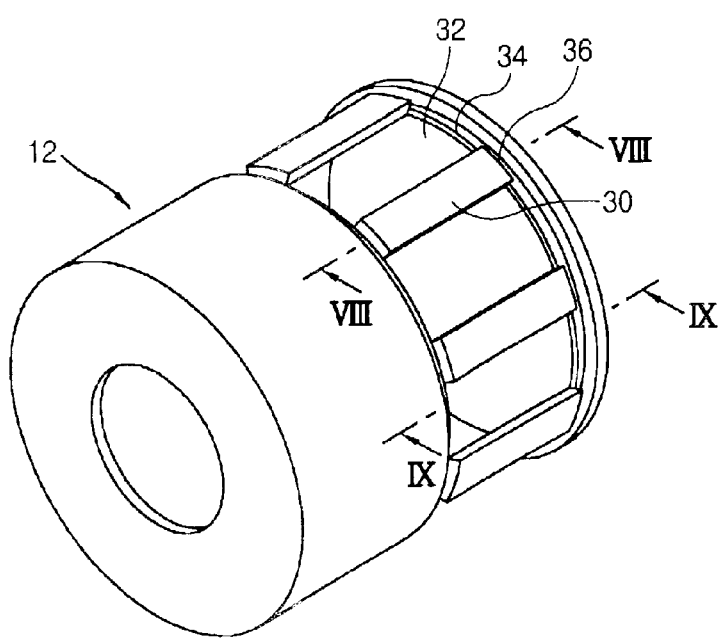
FIG. 7 is a perspective view illustrating a magnet frame of the reciprocating motor in accordance with the present invention.

As depicted in FIG. 6, the disc-shaped inner stator locker 20 has a certain thickness and has an open central portion to be inserted into the outer circumference of the support frame 2, and plural rotation preventive protrusions 22 are formed at the side surface of the inner stator locker 20 to prevent the rotation and the separation of the inner stator 6.

In the inner stator 6, an indenting groove 24 at which the locking ring 18 is indented is formed at the both side surfaces in the circumference direction, and a locking groove 26 in which each rotation preventive protrusions 22 is inserted is formed at part of the plural laminated iron sheets 16.

It is preferable to form three rotation preventive protrusions 22 projected from the internal surface of the inner stator locker 20 at regular intervals.

And, the inner stator locker 20 is fixed to the support frame 2 by welding so as not to rotate. Herein, besides the welding any method capable of fixing the inner stator locker 20 to the support frame 2 not to rotate can be used.

The magnet 10 which is divided into several parts is fixed to the magnet fame 12 in the circumference direction between the outer stator 4 and the inner stator 6.

The cylindrical-shaped magnet frame 12 having a certain thickness is placed in the air gap between the outer stator 4 and the inner stator 6, plural support bars 30 are formed at the portion at which the magnet 10 is installed in the circumference direction at regular intervals, and the magnet 10 is fixedly inserted into a space portion 32 among the support bars 30.

Herein, each support bar 30 has a certain thickness and a width capable of maintaining a strength of the magnet frame 12, and a magnet mounting portion 34 at which the both ends of the magnet 10 are mounted is respectively formed at the both internal side surfaces of the space portion 32.

Figure 8:
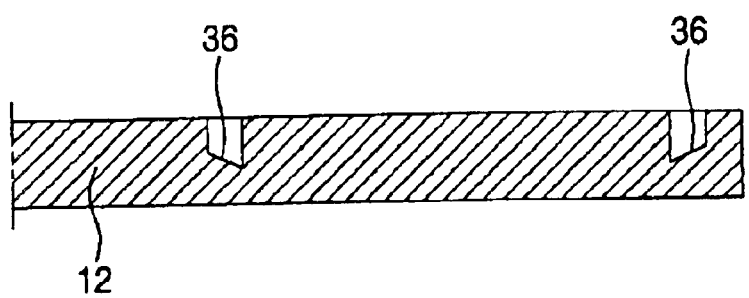
FIG. 8 is a sectional view taken along a line VIII—VIII in FIG. 7.
Figure 9:
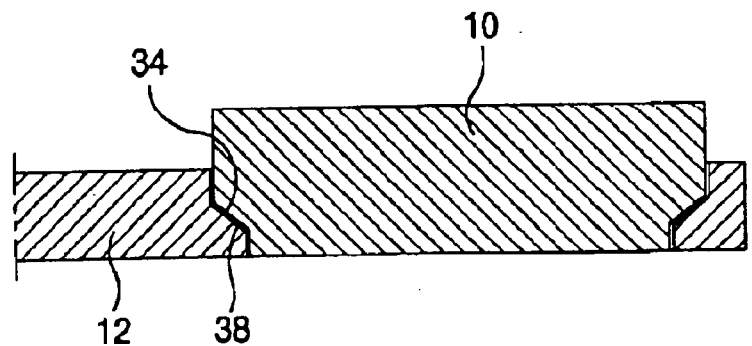
FIG. 9 is a sectional view taken along a line IX—IX in FIG. 7.

As depicted in FIGS. 8 and 9, in the magnet mounting portion 34, a width is getting smaller from the outer circumference toward the inner circumference of the magnet frame 12 as a stepped shape, and the both ends of the magnet 10 are supported by the magnet mounting portion 34.

In more detail, the magnet mounting portion 34 is formed by making a groove having a certain slant in the circumference direction at the inner circumference of the magnet frame 12. Then, as depicted in FIG. 8, a groove 36 is formed at the both sides of the portion at which the support bar 30 is formed. As depicted in FIG. 9, the magnet mounting portion 34 slanted at a certain angle is formed at the both ends of the magnet frame 12 at which the space portion 32 is formed.

Herein, the magnet 10 has a rectangular section shape so as to be inserted into the space portion 32, and a supporting protrusion 38 having a certain angle is formed at the both ends of the magnet 10 to engage with the magnet mounting portion 34.

The operation of the reciprocating motor in accordance with the present invention will be described.

When power is applied to the coil 8, a flux is formed around the coil 8, the flux forms a closed loop along the outer stator 4 and the inner stator 6. Herein, by the mutual operation of the flux formed between the outer stator 4 and the inner stator 6 and the flux formed by the magnet 10, the magnet 10 is linearly moved in the axial direction.

And, when a direction of a current applied to the coil 8 is alternately changed, a flux direction of the coil 8 is changed, and the magnet 10 performs a linear reciprocating motion. Then, by the motion of the magnet 10, the magnet frame 12 at which the magnet 10 is fixed performs a linear reciprocating motion, and accordingly operation parts such as a piston, etc. perform a linear reciprocating motion.

Herein, by installing the inner stator locker 20 between the inner stator 6 and the support frame 2, the rotation or the separation of the inner stator 6 from the support frame 2 can be prevented. In more detail, each rotation preventive protrusion 22 projected from the rear of the inner stator locker 20 is inserted into each locking groove 26 formed at the side surface of the inner stator 6, the inner stator locker 20 is welded to the support frame 2, and accordingly the inner stator locker 20 is fixed to the support frame 2.

And, each support bar 30 is formed at the magnet frame 12 in the circumference direction at regular intervals, and the magnet 10 is inserted into the space portion 32 among the support bars 30.

Figure 10:
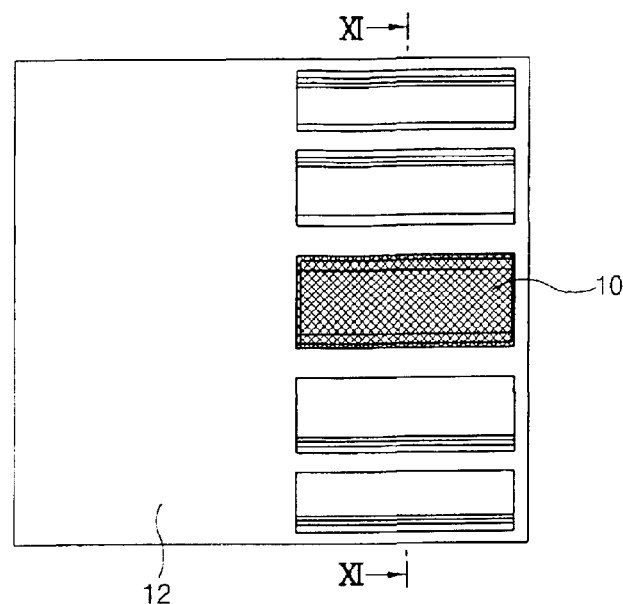
FIG. 10 is a side view illustrating a magnet frame of a reciprocating motor in accordance with another embodiment of the present invention.
Figure 11:
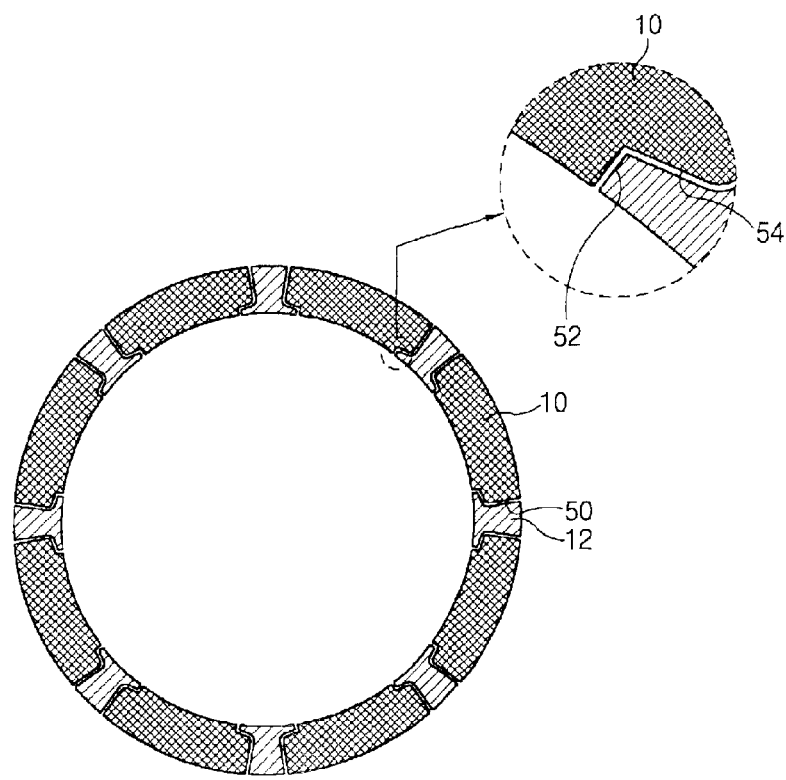
FIG. 11 is a sectional view taken along a line XI—XI of FIG. 10.

FIG. 10 is a side view illustrating a magnet frame of a reciprocating motor in accordance with another embodiment of the present invention, and FIG. 11 is a sectional view taken along a line XI—XI of FIG. 10.

The magnet frame 12 of the reciprocating motor in accordance with the another embodiment of the present invention has a cylindrical-shape, each magnet mounting hole 50 at which the magnet 10 is mounted is formed at the circumference of the magnet frame 12 at regular intervals.

Herein, each magnet mounting hole 50 in which the magnet is mounted is formed at the magnet frame 12 at regular intervals, and each supporting protrusion 52 is formed at the magnet frame 12 so as to project from the outer circumference toward the inner circumference. And, each mounting groove 54 is formed at the magnet 10 from the outer circumference toward the inner circumference to engage with each supporting protrusion 52.

In the reciprocating motor in accordance with another embodiment of the present invention, because the assembly is finished by just inserting the magnet 10 into the magnet mounting hole 50 formed at the magnet frame 12, the assembly is simple and a combining strength can be improved.

Advantages of the reciprocating motor in accordance with the present invention will be described.

By respectively forming each support bar at a portion of a magnet frame at which a magnet is installed in the circumference direction at regular intervals and combining the magnet with a space portion among the support bars, a strength of the magnet frame can be improved, and breakage of the magnet frame in the operation of the motor can be prevented.

In addition, by inserting the magnet into the space portion of the magnet frame, a combining strength of the magnet frame and the magnet can be improved, the separation of the magnet from the magnet frame can be prevented, and accordingly a reliability of the motor can be improved.

In addition, by installing an inner stator locker between an inner stator and a support frame, the rotation of the inner stator by a magnetic force of the magnet can be prevented, the separation of the inner stator from the support frame can be prevented, and accordingly a reliability of the motor can be secured.

What is claimed is:

1. A reciprocating motor, comprising:
    an outer stator supported by a support frame;
    an inner stator being positioned within an inner circumferential surface of the outer stator and being separated from said outer stator by a certain air gap, wherein said inner stator includes an inner circumferential surface supported by said support frame;
    an inner stator locking ring being operatively installed between the inner stator and the support frame and preventing the inner stator from separating from the support frame;
    a magnet being operatively positioned between the outer stator and the inner stator so as to perform a linear motion; and
    a magnet frame having support bars formed at regular intervals to form at least one space portion therebetween in which the magnet is installed along a circumference of said magnet frame.

2. The motor according to claim 1, wherein the inner stator locking ring has an open central portion capable of being inserted into the outer circumference of the support frame and rotation preventive protrusions capable of being inserted into the inner stator in order to prevent the rotation and the separation of the inner stator.

3. The motor according to claim 2, wherein the inner stator locking ring is fixed to the support frame by welding.

4. The motor according to claim 2, wherein supporting grooves are formed in a side surface of the inner stator to engage with the rotation preventive protrusions of the inner stator locking ring.

5. The motor according to claim 1, wherein a magnet mounting portion is formed at both side surfaces of the space portion of the magnet frame to mount the magnet which is inserted into the space portion.

6. The motor according to claim 5, wherein a width of the magnet mounting portion decreases in size from the outer circumference to the inner circumference of the magnet frame and is formed in a stepped shape.

7. The motor according to claim 6, wherein the magnet mounting portion is a groove formed in the inner circumference of the magnet frame.

8. The motor according to claim 6, wherein a supporting protrusion is formed at both ends of the magnet to engage with the magnet mounting portion.

9. The motor according to claim 1, wherein the magnet frame has a cylindrical shape, each magnet mounting hole in which the magnet is mounted is formed along a circumference of the magnet frame at regular intervals, and each supporting protrusion is formed in the magnet frame.

10. The motor according to of claim 9, wherein each mounting groove is formed in the magnet so as to engage with each supporting protrusion.

11. A reciprocating motor, comprising:

an outer stator supported by a support frame;

an inner stator being positioned within an inner circumferential surface of the outer stator and being separated from said outer stator by a certain air gap, wherein said inner stator includes an inner circumferential surface supported by said support frame;

an inner stator locking ring being operatively installed between the inner stator and the support frame and preventing the inner stator from separating from the support frame;

a magnet being operatively positioned between the outer stator and the inner stator so as to perform a linear motion; and a magnet frame, wherein said magnet is installed within said magnet frame along a circumference of said magnet frame.

12. The motor according to claim 11, wherein the inner stator locking ring has an open central portion capable of being inserted into the outer circumference of the support frame and rotation preventive protrusions capable of being inserted into the inner stator in order to prevent rotation and separation of the inner stator.

13. The motor according to claim 12, wherein the inner stator is fixed to the support frame by welding.

14. The motor according to claim 12, wherein supporting grooves are formed in a side surface of the inner stator to engage with the rotation preventive protrusions of the inner stator locker.

15. A reciprocating motor, comprising:

an outer stator supported by a support frame;

being positioned within an inner circumferential surface of the outer stator and being separated from said outer stator by a certain air gap, wherein said inner stator includes an inner circumferential surface supported by said support frame;

a magnet being operatively positioned between the outer stator and the inner stator so as to perform a linear motion; and a magnet frame having a plurality of support bars formed at regular intervals along a circumference of the magnet frame to form at least one space portion in which the magnet is installed wherein a magnet mounting portion is formed at both side surfaces of the at least one space portion of the magnet frame to mount the magnet which is inserted into the at least one space portion, wherein the magnet mounting portion increases in size extending from the outer circumference to the inner circumference of the magnet frame.

16. The motor according to claim 15, wherein the magnet mounting portion is formed in a stepped shape.

17. The motor according to claim 16, wherein the magnet mounting portion is a groove formed in the inner circumference of the magnet frame.

18. The motor according to claim 16, wherein a supporting protrusion is formed at both ends of the magnet to engage with the magnet mounting portion.

* * * * *